US005828565A

United States Patent [19]

Park

[11] Patent Number: 5,828,565

[45] Date of Patent: Oct. 27, 1998

[54] SOLENOID DRIVING CIRCUIT FOR COMPACT DISC PLAYERS FOR CARS

[75] Inventor: Jong Hwa Park, Suwon, Rep. of Korea

[73] Assignee: Samsung Electro Mechanics Co., Ltd., Suwon, Rep. of Korea

[21] Appl. No.: 691,004

[22] Filed: Aug. 5, 1996

[30] Foreign Application Priority Data

Nov. 30, 1995 [KR] Rep. of Korea .................... 95-46633

[51] Int. Cl.[6] .......................... G05B 11/01; G11B 21/02; H01H 9/00

[52] U.S. Cl. ...................... 364/140.01; 361/206; 369/37; 360/75

[58] Field of Search .............................. 364/140, 426.04; 369/37; 360/75; 53/70; 166/66.4; 302/314; 227/131; 310/14, 23, 30, 34, 35; 324/145; 334/10, 19; 361/191, 206; 375/352

[56] References Cited

U.S. PATENT DOCUMENTS 4,924,397 5/1990 Kurihara et al. .................. 364/426.04
5,189,570 2/1993 Maeda et al. ............................ 360/75
5,504,723 4/1996 Ross ......................................... 369/37

FOREIGN PATENT DOCUMENTS

735533A2 3/1996 European Pat. Off. .
2126004A 8/1982 United Kingdom .

*Primary Examiner*—Reba I. Elmore
*Assistant Examiner*—Sheela S. Rao
*Attorney, Agent, or Firm*—Ladas & Parry

[57] ABSTRACT

A solenoid driving apparatus for a compact disc player (CDP) for use in cars which enables the CDP to operate effectively and to continue to a following operation smoothly utilizing a latch type solenoid. The apparatus includes a disc detecting section for detecting an insertion state of a compact disc into the CDP to produce first and second detection signals, a microcomputer for receiving the first and second detection signals from the disc detecting section and producing first and second control signals in accordance with the first and second detection signals, a motor driving section for providing a driving force to a driving mechanism of the CDP in accordance with the first control signal of the microcomputer, and a solenoid driving section for driving the latch type solenoid for a predetermined time when the second control signal of the microcomputer is supplied to the solenoid driving section.

2 Claims, 1 Drawing Sheet

SOLENOID DRIVING CIRCUIT FOR COMPACT DISC PLAYERS FOR CARS

BACKGROUND OF THE INVENTION

1. Field of the Invention

The present invention relates to a solenoid driving apparatus for a compact disc player (CDP) for use in cars. In particular, the present invention relates to a solenoid driving apparatus for a single CDP for cars which employs a latch type solenoid that is driven by a microcomputer when the insertion of a disc into the CDP is sensed by a sensor or a switch.

2. Description of the Prior Art

Generally, a solenoid generates a magnetic force when a driving voltage is supplied to its driving coil, and thus is energized to physically pull or actuate an associated objective. Especially, among various kinds of solenoids, a latch type solenoid has a positive (+) terminal and a negative (−) terminal, and operates in such a manner that it loses its magnetic force when a driving voltage is supplied thereto while it holds its magnetic force when the driving voltage is cut off.

SUMMARY OF THE INVENTION

It is an object of the present invention to provide a solenoid driving apparatus for a CDP for cars which enables an effective operation of the single CDP utilizing a latch type solenoid.

In order to achieve the above object, the present invention provides a solenoid driving apparatus for a CDP for cars comprising:

a disc detecting apparatus for detecting an insertion state of a compact disc into a Compact Disc Player to produce first and second detection signals;

a microcomputer for receiving first and second detection signals from a disc detecting apparatus and producing first and second control signals in accordance with the first and second detection signals;

a motor driving apparatus for providing a driving force to a driving mechanism of the Compact Disc Player in accordance with a first control signal of the microcomputer; and a solenoid driving circuit for driving a latch type solenoid for a predetermined time when a second control signal of the microcomputer is supplied to a solenoid driving circuit.

BRIEF DESCRIPTION OF THE DRAWINGS

The above object, other features and advantages of the present invention will become more apparent by describing the preferred embodiment thereof with reference to the accompanying drawings, in which.

DETAILED DESCRIPTION OF THE PREFERRED EMBODIMENT

Figure 1:
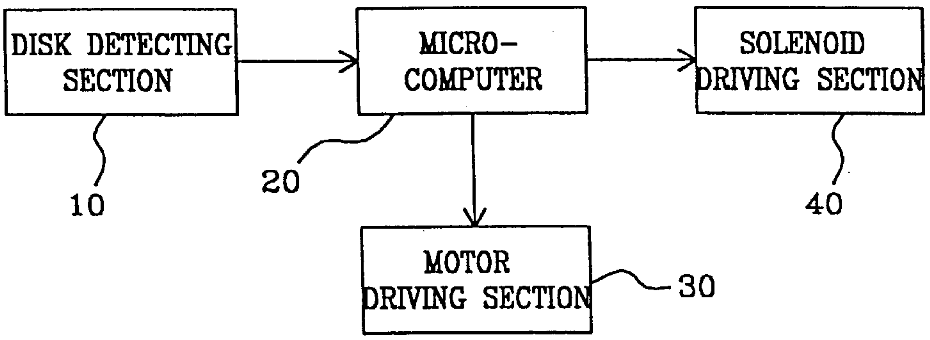
FIG. 1 is a block diagram of the solenoid driving apparatus for a CDP for cars according to the present invention.

FIG. 1 shows the solenoid driving apparatus for a CDP for cars according to the present invention. Referring to FIG. 1, the solenoid driving apparatus according to the present invention comprises a disc detecting section 10 for detecting an insertion state of a compact disc into the CDP to produce first and second detection signals; a microcomputer 20 for controlling the operation of the CDP, the microcomputer 20 receiving the detection signals from the disc detecting section 10 and producing first and second control signals according to the insertion state of the compact disc, a motor driving section 30 for providing a driving force to a driving mechanism (not illustrated) of the CDP acccording to the first control signal of the microcomputer 20 when the compact disc is inserted into the CDP, and a solenoid driving section 40 for driving a solenoid according to the second control signal when the insertion of the compact disc into the CDP is completed.

The operation of the solenoid driving apparatus for a CDP according to the present invention as described above will be explained with reference to FIGS. 1 and 2.

First, the disc detecting section 10 detects the compact disc insertion state and produces the first and second detection signals indicating insertion and insertion completion, respectively. The microcomputer 20 receives the detection signals from the disc detecting section 10 and produces the first and second control signals in accordance with the insertion state of the compact disc.

The motor driving section 30 receives the first control signal from the microcomputer 20 and provides the driving force to the CDP driving mechanism if the compact disc is inserted into the CDP. The solenoid driving section 40 receives the second control signal from the microcomputer 20 when the insertion of the compact disc into the CDP is completed, and drives the solenoid while the second control signal of a ‘low’ level is applied thereto.

Figure 2:
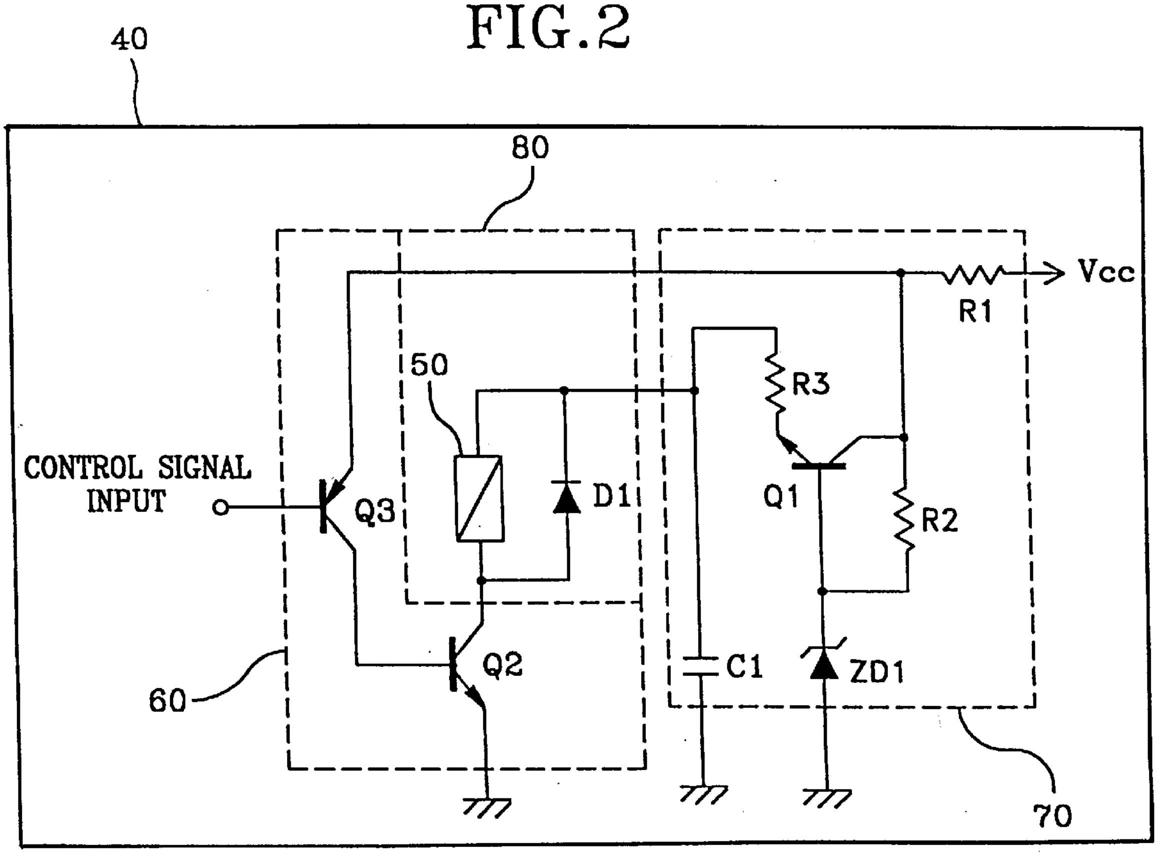
FIG. 2 is a schematic circuit diagram of the solenoid driving section in FIG. 1 according to a preferred embodiment of the present invention.

In FIG. 2, the solenoid driving section 40 includes a control section 60 for controlling the operation of the latch type solenoid 50, and a voltage regulator circuit 70 for providing a regulated driving voltage to the latch type solenoid 50. The regulator circuit includes a first transistor Q1 and the control section 60 includes second transistor Q2 and third transistor Q3.

The third transistor Q3 performs a switching operation in accordance with the input voltage Vcc applied to its emitter through a first resistor R1 and the control signal applied to its base from the microcomputer 20. The base of the second transistor Q2 is connected to receive the collector output signal of the third transistor Q3 and performs a switching operation for the latch type solenoid 50. A diode D1 is connected in parallel to solenoid 50 for prevention of a counter-electromotive force.

The regulated voltage circuit 70 includes a third resistor R3 connected to the emitter of transistor Q1 for applying to the solenoid 50 the input voltage Vcc which is supplied to its collector through the first resistor R1 and to its base through the second resistor R2 after being regulated at a predetermined level by a Zener diode ZD1 connected to its base. The first transistor Q1 distributes and supplies the output signal from its emitter to the solenoid 50 through the third resistor R3 connected in series and the capacitor C1 connected in parallel.

The operating voltage of the latch type solenoid 50 is normally in the range of 1.5 to 2.5 Volts, which is provided by the voltage regulator section 70.

According to the voltage regulator section 70, an input voltage $V_{CC}$ is applied through resistor R2 to the base of the switching transistor Q1 which is coupled to the Zener diode ZD1, and thus a voltage as high as the Zener voltage of the Zener diode ZD1 is applied to the base of the transistor Q1, causing the transistor Q1 to be turned on. Accordingly, to the latch type solenoid 50 in the solenoid section 80 is supplied a driving voltage which is given by $$V_{CC}-V_{B-E}-V_{R3}$$

Where, $V_{B-E}$: base-emitter voltage drop of the transistor Q1, $V_{R3}$: voltage drop through resistor R3.

In the event that the insertion of the compact disc into the CDP is detected by the disc detecting section 10, the microcomputer 20 outputs the first control signal to the motor driving section 30 so that the motor driving section 30 drives the driving mechanism to place the inserted disc on a pick-up position.

Thereafter, if the completion of the disc insertion is detected by the disc detecting section 10, the microcomputer 20 outputs the second control signal of a 'low' level to the solenoid driving section 40 for a predetermined time.

Specifically, the transistor Q3 in the control section 60 receives the 'low' level control signal at its base and thus is turned on, causing the transistor Q2 also to be turned on. Accordingly, the driving voltage provided from the voltage regulator section 70 is supplied to the latch type solenoid 50, causing the solenoid 50 to lose its magnetic force.

If the predetermined time has elapsed thereafter, the microcomputer 20 terminates the output of the 'low' level control signal, and this causes the transistors Q3 and Q2 to be turned off, and the latch type solenoid 50 holds its magnetic force. As described above, the Zener voltage of the Zener diode ZD1 in the voltage regulator section 70 is determined so that the regulated driving voltage is provided to the latch type solenoid 50.

From the foregoing, it will be apparent that the solenoid driving apparatus for a CDP for cars according to the present invention provides advantages in that it enables the CDP to operate effectively and to continue to a following operation smoothly by employing a latch type solenoid which operates in such a manner that it loses its magnetic force when its driving voltage is applied thereto, while it holds its magnetic force when its driving voltage is not applied thereto.

While the present invention has been described and illustrated herein with reference to the preferred embodiment thereof, it will be understood by those skilled in the art that various changes in form and details may be made therein without departing from the spirit and scope of the invention.

What is claimed is:

1. A solenoid driving circuit for a compact disc player for use in cars, comprising:

a disc detecting section for detecting an insertion state of a compact disc into the compact disc player to produce detection signals;

a microcomputer for controlling the entire operation of the compact disc player and receiving detection signals from the disc detecting section to produce control signals in accordance with the detection signals;

a motor driving section for providing a driving force to a driving mechanism of the compact disc player in accordance with the control signal of the microcomputer; and a solenoid driving section, comprising:

a latch type solenoid;

a control section for controlling the operation of the latch type solenoid; and a regulated voltage circuit for providing a regulated driving voltage to the latch type solenoid, wherein the latch type solenoid is driven when the control signal of the microcomputer is supplied to the solenoid driving section, said regulated voltage circuit including a first transistor, said control section comprising second and third transistors;

first, second and thirds resistors, said third transistors performing a switching operation in accordance with the input voltage applied to its emitter through said first resistor and the control signal applied to its base from the microcomputer;

said second transistor having a base connected to the collector of the third transistor to receive an output signal of the third transistor and perform a switching operation of the latch type solenoid, a first diode being connected in parallel with the solenoid for prevention of a counter-electromotive force.

2. A solenoid driving circuit for a compact disc player for use in cars as claimed in claim 1, wherein said first transistor is connected for distributing and supplying said regulated voltage to the solenoid, said third resistor being connected to the emitter of the first transistor for applying the regulated voltage to the solenoid, the input voltage being supplied through the first resistor to the collector of the first transistor and through the a second resistor to the base of the first transistor, after being regulated at a predetermined level by a Zener diode connected to said base of the first transistor; and a capacitor connected to the third resistor in parallel with the solenoid.

* * * * *